July 9, 1957      C. G. GOETZEL ET AL      2,798,809
METHODS OF INFILTRATING HIGH MELTING SKELETON BODIES
Filed June 9, 1952      4 Sheets-Sheet 3

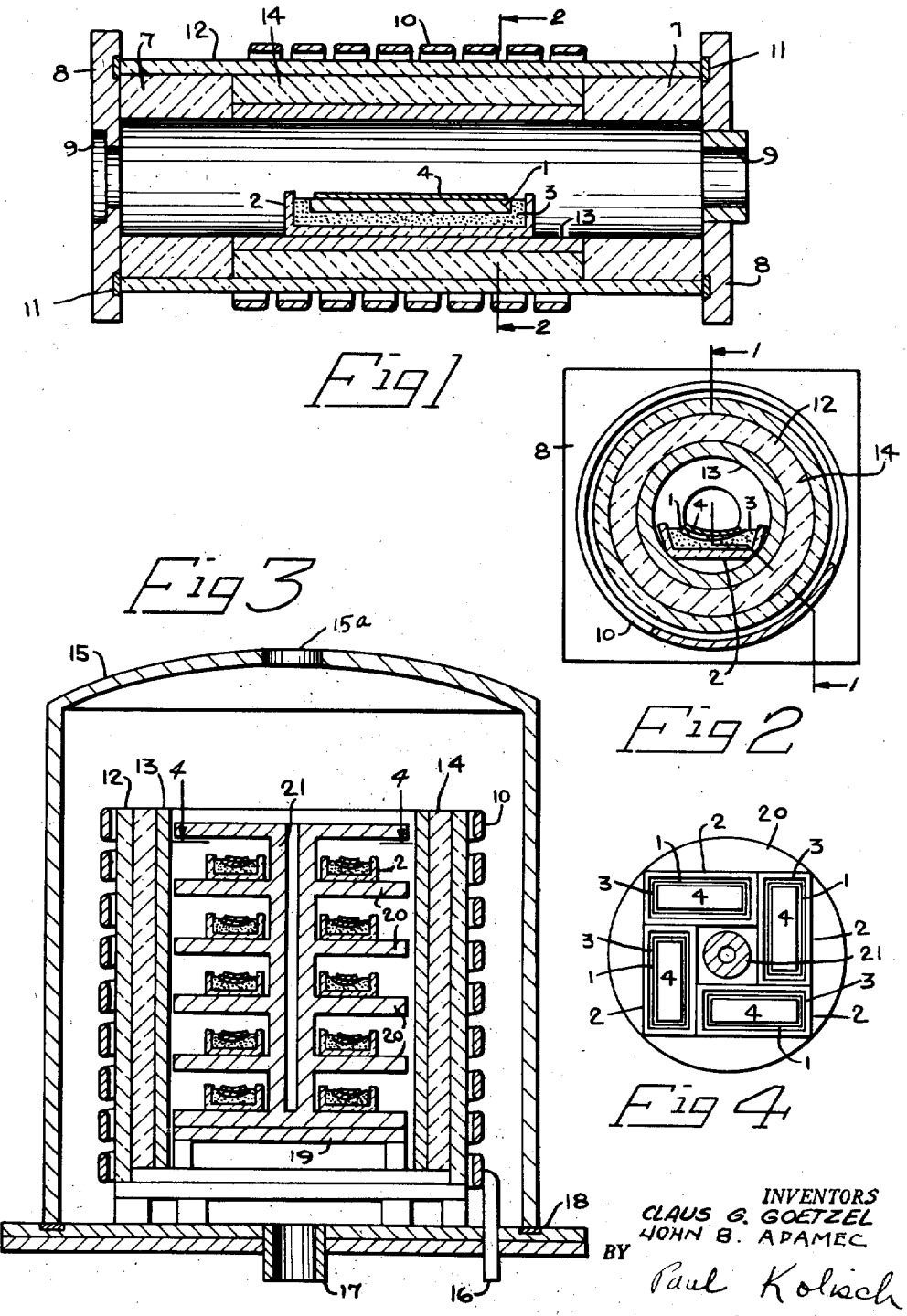

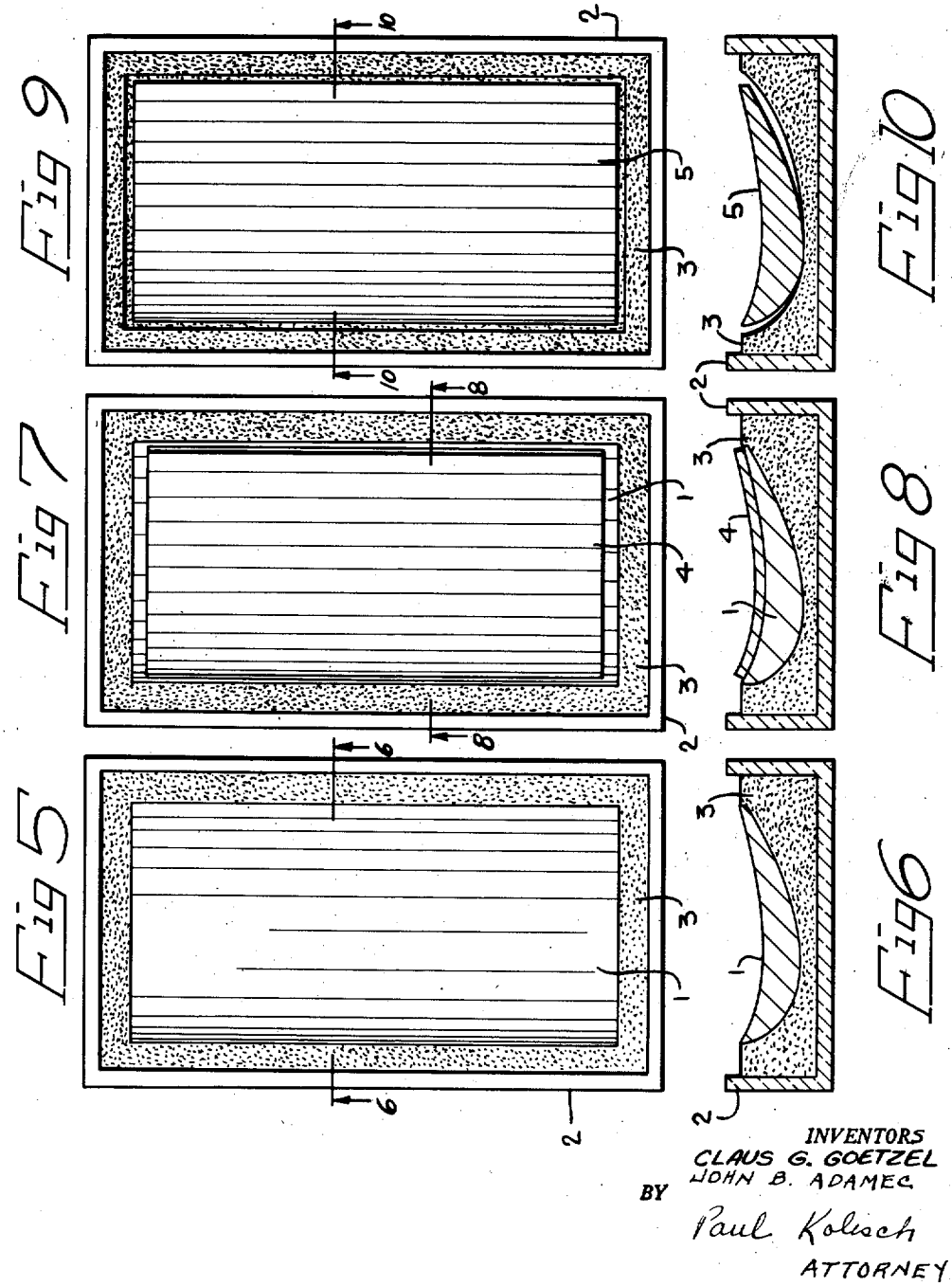

TOP VIEW      BOTTOM VIEW

  CARBON

  C.P. ZIRCONIUM OXIDE

  C.P. THORIUM OXIDE

  C.P. MAGNESIUM OXIDE

  C.P. ALUMINUM OXIDE

TITANIUM CARBIDE TEST BARS INCONEL-INFILTRATED WHILE EMBEDDED IN DIFFERENT POWDER BEDS

Fig 11

TOP VIEW

BOTTOM VIEW

Fig 15

CHEMICALLY PURE ALUMINUM OXIDE POWDER BED-EMBEDDED INCONEL-INFILTRATED TITANIUM CARBIDE TEST BAR AFTER HOT BENDING AT 1000°C AND 127,500 PSI STRESS

INVENTORS
CLAUS G. GOETZEL
JOHN B. ADAMEC
BY
ATTORNEY

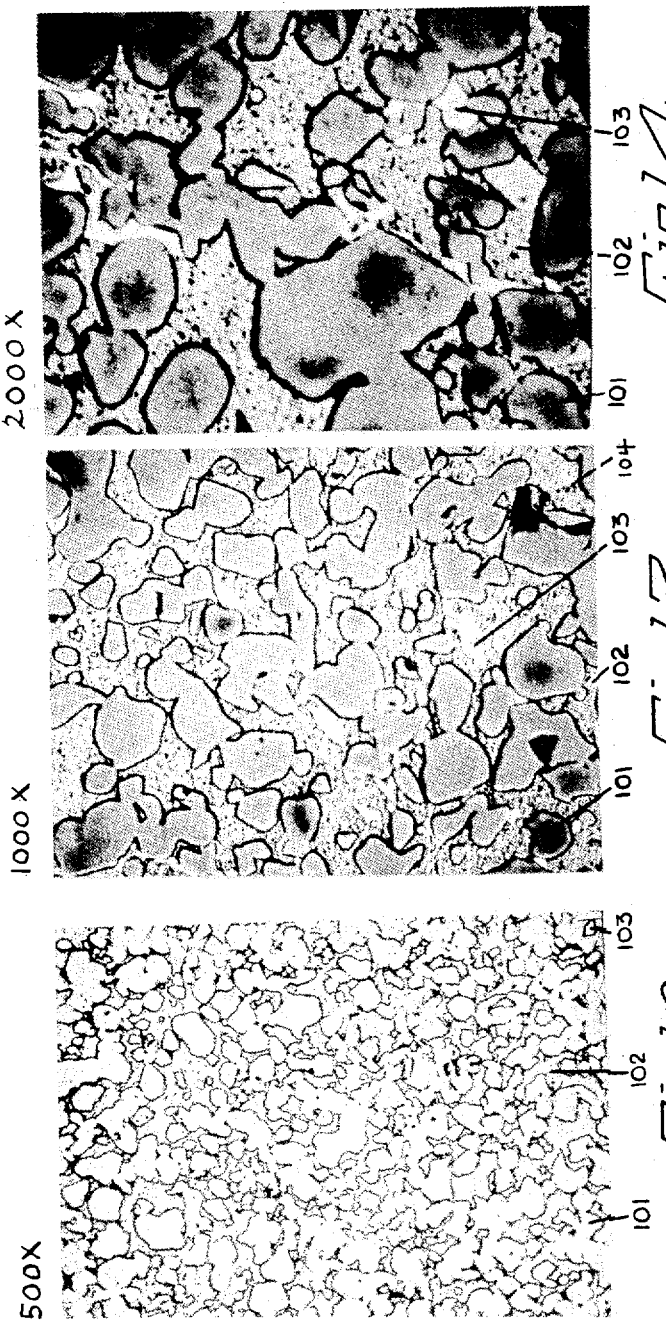

United States Patent Office 2,798,809
Patented July 9, 1957

2,798,809

METHODS OF INFILTRATING HIGH MELTING SKELETON BODIES

Claus G. Goetzel, Yonkers, and John B. Adamec, Floral Park, N. Y., assignors to Sintercast Corporation of America, Yonkers, N. Y., a corporation of New York Application June 9, 1952, Serial No. 292,498

4 Claims. (Cl. 75—200)

This invention relates to methods of infiltrating high melting skeleton bodies made of refractory metal carbide powders, and particularly titanium carbide powder, with lower melting metals and metal alloys. The resulting infiltrated bodies are particularly useful as engine parts, tools, and other articles exposed to high temperatures, corrosion, abrasion, erosion, etc.

Skeleton bodies made of high melting refractory metal, metal alloy, and metal compound powders are customarily infiltrated by placing them into ceramic vessels or boats and then applying to one or more surface portions the molten infiltrant metal. The molten infiltrant will wet the contact surfaces of the skeleton body and penetrate into the pores of the skeleton by virtue of capillary forces. If the infiltrant is positioned above the skeleton body, then gravity forces will supplement, and if it is positioned below the skeleton, then gravity forces will counteract the capillary forces.

One inherent disadvantage of such method is that the positioning of the infiltrant is of great importance to insure proper infiltration, particularly if titanium carbide is used as a skeleton material. The molten infiltrant will flow downward either inside the skeleton body or along the outside of the surfaces, or both. Depending on the fluidity of the molten infiltrant and its surface tension, variable quantities of it will move downward through the skeleton or along its surface.

Another difficulty may arise from a possible alloying between the molten infiltrant and the skeleton material. Excessive solubility may increase the melting temperature and change the fluidity of the molten infiltrant until it becomes too viscous for proper penetration. Internal stresses in the skeleton body, such as produced by gaseous reaction products between the molten infiltrant and the skeleton material, may also interfere with proper infiltration.

Tests seem to indicate that part of the infiltrant metal did not penetrate the skeleton body but found its way down along the outside surfaces of the body, collecting in lumps or layers thereon.

An important object of the invention is to prevent the undesirable flow of the molten infiltrant along the outside of the skeleton surfaces. This is accomplished by placing the skeleton bodies in a layer of material which blocks the passage of the molten infiltrant along any paths other than those provided by and in the inter-connected pore system of the skeleton. Preferably, the layer conforms to the shape and thus supports the skeleton body during the process of infiltration while a substantial part of the composite mass is in a liquid or mushy state.

In accordance with the invention, a bedding of aluminum oxide powder is used for skeleton bodies made of a titanium carbide powder containing about 1 to 3 percent free carbon, to which up to 15 percent metallic chromium powder and up to 10 percent chromium carbide powder may be added.

The infiltration of the titanium carbide bodies takes place in a controlled furnace atmosphere of subatmospheric pressure, i. e. a technical vacuum of 500 to 50 microns mercury column, which insures freedom from gas inclusions during the infiltration. Preferably the skeleton bodies are sintered in advance in a reducing atmosphere of a subatmospheric pressure of 300 to 50 microns mercury column and at a temperature of at least 100° C. above the temperature used for the subsequent infiltration. The upper limit of the sintering temperature is governed by normal operative conditions, and particularly by the control of excessive shrinkage of the skeleton body; it may go up to 300° C. above the temperature used for the subsequent infiltration.

Skeleton bodies made of titanium carbide, particularly if it contains free carbon, react with the materials with which they come into contact during infiltration. The reaction is pronounced whether the infiltrant contains nickel, iron, cobalt, chromium, tungsten, molybdenum, and alloys thereof.

Best results were obtained with chemically pure granular aluminum oxide powder between the walls of a refractory vessel or boat and the skeleton body. It was found that the powder bed shrank slowly, smoothly, and uniformly away from the skeleton body at a rate in harmony with the downward penetration of the infiltrant metal through the skeleton body. This, in turn, appeared to produce complete sealing and tight encasing of the skeleton body at the beginning of the infiltration process, whereby the molten infiltrant pool remains on top of the skeleton body until it penetrates downward through it. The tight seal between the powder pack and the skeleton body gradually loosens as the mass of molten metal on top of the skeleton is depleted. The gap forms all around when the metal pool on top of the skeleton has completely disappeared and thus, when the skeleton body has been completely infiltrated, the resulting infiltrated titanium carbide body has smooth surfaces, including the surfaces initially contacted by the pack. The edges, projections, etc. will be sharp, and the dimensions of the body accurate.

The invention will now be described, as applied to the production of a turbine blade, with reference to the attached drawings, in which Fig. 1 is a vertical sectional view along line 1—1 of Fig. 2 of a customary high frequency heated vacuum furnace to be used for the infiltration of a single turbine blade skeleton in accordance with this invention;

Fig. 2 is a vertical sectional view on line 2—2 of Fig. 1;

Fig. 3 is a vertical sectional view of a high frequency vacuum furnace for the infiltration of a plurality of turbine blade skeletons;

Fig. 4 is a top view on line 4—4 of Fig. 3;

Fig. 5 is a top view of the pack embedded turbine blade skeleton;

Fig. 6 is a vertical cross-section on line 6—6 of Fig. 5;

Fig. 7 is a top view of the skeleton blade with the infiltrant applied thereto;

Fig. 8 is a vertical cross-section on line 8—8 of Fig. 7;

Fig. 9 is a top view on the finished infiltrated blade;

Fig. 10 is a cross-section on line 10—10 of Fig. 9;

Fig. 11 is a comparative top and bottom view of test bars infiltrated while embedded in various metal oxide powders;

Figs. 12–14 show the microstructure of a titanium carbide skeleton infiltrated in accordance with the invention with an Inconel alloy while embedded in chemically pure aluminum oxide; and Fig. 15 illustrates a top and bottom view of a test bar showing the bending capacity of a titanium carbide body made in accordance with the invention.

As apparent from Figs. 1, 2 a horizontal high frequency vacuum furnace is used for the infiltration of a single turbine blade 1. The furnace is of a customary build; it consists essentially of a quartz tube 12 closed at both ends by the cover plates 8 provided with center openings 9, one for the installation of a temperature sight window and the other one to serve as a connection to a vacuum pump. The furnace is provided with a high frequency coil 10, two vacuum seals 11, two ceramic spacer tubes 7, an inner graphite tube 13, and an insulation 14 therebetween.

A ceramic vessel 2 is located in the furnace to house the blade skeleton 1 to be infiltrated. An aluminum oxide bed 3 is provided between vessel 2 and the turbine blade skeleton 1; a strip 4 of the infiltrating metal is located on top of the skeleton. As apparent from Fig. 2, vessel 2 rests with its both sides on the graphite tube 13.

Figs. 3 and 4 illustrate a vertical vacuum furnace suitable for infiltration of a group of blades. The furnace consists of a water-cooled vacuum tight metal bell 15 provided with a temperature sight window 15a, an outer quartz tube 12, an inner graphite tube 13, and an insulation 14 therebetween. An induction coil 10 provided with current connections 16 surrounds the furnace. A tube 17 in the bottom of the furnace leads to the vacuum pump. The bell 15 is vacuum sealed at 18. A graphite structure consisting of a bottom 19, tiers 20, and center tube 21 supports the ceramic vessels 2 in which the turbine blade skeletons 1 are infiltrated from metal strips 4. As in the previously described embodiment, an aluminum oxide bed 3 is located between the skeletons 1 and the vessels 2. The relative location of the infiltration vessels on the tiers 20 is apparent from Fig. 4.

Figs. 5–10 illustrate the arrangement of the infiltration vessels 2. The skeleton body 1 of a turbine blade consisting of a free carbon containing titanium carbide is positioned in vessel 2; a pack or bedding 3 of chemically pure alumina is located between the skeleton body and the inner walls of vessel 2. Figs. 7 and 8 correspond to Figs. 5 and 6, with the exception that a strip 4 of the infiltrant metal is placed on top of the blade, i. e., on a surface portion thereof out of contact with the bedding 3.

Figs. 9 and 10 illustrate the turbine blade 5 after completed infiltration. Except for a small bottom portion, where the blade rests on the bedding, the latter is shown retracted from the blade. The finished blade will have a smooth surface free from erosions and defects, sharp edges, it will be uniformly impregnated, and it will retain its intended shape.

The turbine blades are infiltrated while a technical vacuum of 500 to 50 microns Hg pressure is maintained in the furnace at about 1500° C. The infiltrant may be a chromium-containing nickel-base alloy. At the end of the treatment the recession of the alumina powder pack produces a gap of approximately ⅜₄″.

Experiments indicate that good results will be obtained with chemically pure aluminum oxide granular powder passing through a 100 mesh sieve. Two typical sieve analyses of this granular aluminum oxide powder passing through a 100 mesh sieve are given below:

|  | (1) | (2) |
| --- | --- | --- |
|  | Percent | Percent |
| On 100 mesh | 0 | 0 |
| On 140 mesh | 24 | 32 |
| On 230 mesh | 54 | 60 |
| On 325 mesh | 16 | 6 |
| Through 325 mesh | 6 | 2 |

Two typical chemical analyses of this material shown as impurities the following:

|  | Percent | Percent |
| --- | --- | --- |
| Chloride (Cl) | 0.01 | 0.000 |
| Iron (Fe) | 0.019 | 0.000 |
| Loss on Ignition | 0.09 | 0.03 |
| Heavy Metal (as Pb) | 0.000 | 0.007 |
| Sulfate (SO₄) | 0.000 | 0.000 |

Magnesium oxide, thorium oxide, zirconium oxide, silicon carbide, and thermatomic carbon powders (Norblack) were found less satisfactory than the C. P. aluminum oxide granular powder in the infiltration of titanium carbide bodies. Beds of magnesium oxide produced partial impregnation of the bed and, consequently, poor surface finish and incomplete infiltration of the titanium carbide body. Zirconium oxide packs appeared to react with the titanium carbide and the free carbon in the carbide skeleton, resulting in reduction and carburization of the pack at the interface with the skeleton, and deep impregnation of the zirconium carbide thus formed. The infiltration of the titanium carbide body was poor and spotty and impregnated zirconium carbide patches were welded onto the surface of the titanium carbide body where it was originally in contact with the pack. Similar results were produced when using a thorium oxide powder pack. Silicon carbide and thermoatomic carbon beds or packs produced only partial downward penetration and infiltration of the titanium carbide skeleton bodies. Fig. 11 shows comparative views of the surface appearance of titanium carbide test bars infiltrated with the nickel alloy Inconel (approximately 80% Ni, 14% Cr and 6% Fe) in powder beds of the above mentioned substances, illustrating the superiority of the chemically pure aluminum oxide bed.

As an example of the beneficial effects obtained by using chemically pure aluminum oxide granular powder pack, the following Table I shows typical properties that can be obtained in titanium carbide test bars as compared to test bars infiltrated in packs of the other substances cited.

The great strength of the titanium carbide test bars infiltrated in chemically pure aluminum oxide powder pack is further illustrated in the photomicrographs of Figs. 12–14 showing, at 500, 1000, and 2000 diameters magnification, complete infiltration and absence of any significant residual porosity. In these figures the numeral 101 denotes the titanium carbide grains, the numeral 102 denotes the Inconel-base infiltrant alloy.

Microscopic examination indicates the formation of a finely dispersed, hard and strong phase 103 in the solidified Inconel infiltrant alloy network 102. This phase may be an intermetallic compound in the system nickel-aluminum, deriving its elements from the infiltrant alloy and the metallic aluminum liberated by the pack during the infiltration process.

TABLE I

*Effect of pack material on properties of Inconel-infiltrated titanium carbide test bars*

| TiC (Vol. Percent) | Pack Material | Degree of Infiltration, Percent | Modulus of Transverse Rupture, p. s. i. | | Deflection Under Max. Load at 1,000° C., in. |
| --- | --- | --- | --- | --- | --- |
| | | | at Room Temp.[1] | at 1,000° C.[2] | |
| 67 | C. P. Silicon Carbide | 84 | 67,500 / 67,500 | 62,500 | 0.058 |
| 66 | Carbon | 94 | 81,000 / 79,000 | 67,000 | 0.091 |
| 65 | C. P. Zirconium Oxide | | 89,000 / 111,000 | 70,000 | 0.0165 |
| 63 | C. P. Thorium Oxide | 95 | 84,000 / 84,000 | 72,000 | 0.054 |
| 66 | C. P. Magnesium Oxide | | 72,500 / 63,500 | 67,000 | 0.049 |
| 64 | C. P. Aluminum Oxide | 100 | 163,000 / 153,000 | 150,000 | 0.130 |

[1] Tested near each end of test bar.
[2] Tested in middle of test bar.

The Vickers hardness of phase 103 as tested on a Bergsman micro hardness tester was found to be 1100 kg./mm.² as compared to a hardness of 2900 kg./mm.² of the TiC grains 101 and a hardness of 600 kg./mm.² for the solidified Inconel infiltrant alloy network 102.

The grain size of the aluminum oxide appears to influence the formation of this aluminum containing phase in the solidified infiltrant. If instead of the granular 100 mesh aluminum oxide powder, a powder of a finer grain size is used, then the aluminum containing phase in the solidified infiltrant increases and the mechanical properties of the resulting infiltrated titanium carbide product are depreciated. If, for example, a fine-milled aluminum oxide powder, all passing through a 325 mesh sieve, is used as a bed, then the aluminum containing phase will be 5 to 10 percent of the infiltrant volume, instead of the 2 to 4 percent obtained when using 100 mesh aluminum oxide powder. The transverse rupture strength at room temperature is reduced from over 150,000 p. s. i. to about 125,000 p. s. i. and less, the transverse rupture strength at 1000° C. is reduced from about 150,000 to about 110,000 p. s. i. and the deflection at maximum load at 1000° C. is reduced from 0.130 to about 0.090 inch.

The excellent hot ductility and bending capacity in conjunction with the high hot strength of a titanium carbide body infiltrated with the nickel alloy Inconel while embedded in chemically pure aluminum pack is illustrated by Fig. 15. A test bar supported at its ends and centrally loaded at a temperature of 1000° C. could be bent by a stress of 127,500 pounds per square inch to an angle of 20° without any signs of failure.

It is noteworthy that the process here disclosed assures uniform properties throughout the entire thickness of the titanium carbide body, i. e., along the entire path of the downward penetrating infiltrant alloy. A marked differential in strength and ductility between the top and the bottom regions or fibers of the infiltrated titanium carbide bodies caused by gravitational accumulation of excess infiltrant alloy in the bottom part of the skeleton and at its surrounding bottom faces has been a common attribute of titanium carbide bodies infiltrated in the customary way. Such anisotropy in the properties is entirely absent in bodies produced in accordance with the procedure herein disclosed. This is shown by the data of the following Table II where two identical bars bend-tested in reverse are shown in the case of open space infiltration versus infiltration in chemically pure aluminum oxide powder pack.

TABLE II

*Effect of method of infiltration on directional properties of Inconel-downward infiltrated titanium carbide test bars*

| TiC (Vol. Percent) | Infiltration Method | Test Load Application | Modulus of Transverse Rupture, p. s. i. | | Deflection Under Max. Load at 1,000° C. in. |
| --- | --- | --- | --- | --- | --- |
| | | | at Room Temp.[1] | at 1,000° C.[2] | |
| 65 | Open Aluminum Oxide. | Downward | 161,500 / 167,500 | 94,000 | 0.30 |
| 65 | | Upward | 74,000 / 115,000 | 88,500 | 0.12 |
| 64 | C. P. Aluminum Oxide. Powder Pack. | Downward | 163,000 / 165,000 | 156,000 | 0.115 |
| 64 | | Upward | 196,000 / 199,000 | 133,000 | 0.135 |

[1] Tested near each end of test bar.
[2] Tested in middle of test bar.

The time to be allowed for infiltration must be sufficient to insure complete penetration of the skeleton body by the molten infiltrant and attainment of equilibrium and saturation conditions by solution of the titanium carbide of the skeleton in the molten infiltrant. The photo micrographs of Figs. 13 and 14 show a multitude of very small particles 104 in the infiltrant alloy 102. These particles are believed to be a titanium carbide, which is precipitated in the infiltrant alloy matrix phase 102 during its cooling, since titanium and carbon were dissolved in excess at the infiltration temperature. A rate of infiltrant penetration into the skeleton body of ½ to 1 inch per hour was found to be practicable.

The infiltration temperature depends on the liquidus and solidus temperature of the respective alloy. Best conditions and highest ultimate properties are obtained if the infiltration temperature lies between 50° and 250° C. above the liquidus temperature of the infiltrant alloy. In the case of the chromium-containing nickel-base alloys Inconel, Nichrome-V and Hastelloy-C, an infiltration temperature of 1475–1500° C. was found most satisfactory. The foregoing designated alloys are examples of chromium-containing, nickel-base alloys. Thus, the alloy known by the trademark Inconel, as pointed out hereinbefore, comprises approximately 80% nickel, 14% chromium, and 6% iron. The alloy referred to as Nichrome V contains approximately 80% nickel and 20% chromium (see page 58, National Bureau of Standards Circular 485, 1950) while Hastelloy "C" comprises about 54.5% to 59.5% nickel, about 13% to 16% chromium, about 15% to 19% molybdenum, about 3.5% to 5.5% tungsten, about 4% to 7% iron and about 0.04 to 0.15% carbon (see page 579 of the ASM Metals Handbook, 1948 edition).

It is essential that the infiltration of titanium carbide skeleton bodies be carried out in a reducing atmosphere of subatmospheric pressure, e. g. a carbon monoxide atmosphere generated from an induction heated carbon tube furnace which is evacuated to a pressure from 300 down to 100 microns Hg column or less. Therefore, the consistency of the chemically pure aluminum oxide powder pack should not be disturbed by the evacuation. The granular nature of the powder renders a loosely packed bed unstable and the spontaneous removal of the air in the powder mass by evacuation during heating may cause disturbances, eruptions and dislocations of the powder pack. Such detrimental effects tend to defeat the very purpose of the powder pack which is to provide a tight fitting seal around the skeleton body insuring the flow of the molten infiltrant in a downward direction through the skeleton body. Obviously, any discontinuity of the powder pack seal caused by a blowing out of the powder would produce openings and passages along the side or bottom surfaces of the skeleton body affording paths through which molten infiltrant alloy could flow unrestricted or at a much faster rate than through the channels of the interconnected pore system of the skeleton body. Depending on the volume of the powder pack, imperfections, adhesions and erosions at the surface, and partially incompletely penetrated and filled pores and pore groupings in the interior of the infiltrated titanium carbide bodies will be observed, and the properties of the infiltrated bodies will be found generally inferior.

This difficulty is overcome in conformity with the invention by various procedures converting the aluminum oxide powder into a coherent or settled bed. A simple method consists of filling the powder mass into the ceramic vessel or boat, settling the fluid bed by tapping and vibration, depositing the skeleton body into position in the bed, pouring the powder for the seal along the sides of the skeleton body, and settling this powder mass again by tapping and vibration. A bed so prepared will have sufficient mechanical coherence to withstand infiltration of the skeleton under vacuum without disruptions and blowouts, provided that evacuation be gradual and slow, particularly at the beginning when the pressure is reduced from atmospheric (760 mm. Hg) to a technical vacuum in the order of 1000–500 microns. Such slow and controlled evacuation is accomplished by only very slightly opening ("cracking") the valve connecting the furnace with the vacuum pump.

If a stronger bed is required, it is fired at high temperature in air or in a technical vacuum at 1500 to 1800° C. for the purpose of partially vitrifying the aluminum oxide powder immediately before the infiltration step.

Another method is to mix from 1 to 10 percent (preferably 2.5 percent) paraffin wax in the form of a 10 percent carbon tetrachloride solution with C. P. granular $Al_2O_3$ powder, dry the powder mixture in air to remove the $CCl_4$, press the mixture at 15 t. s. i. into the shape of a pack conforming to the shape of the article to be infiltrated, and burn off the paraffin at 150–600° C. The mechanically bonded granular aluminum oxide powder bed is then sufficiently coherent to carry the skeleton body and to withstand the vacuum treatment during infiltration without any disturbance to its shape or consistency. The bed can be strengthened by firing in air at 1600–2000° C. for the purpose of partially vitrifying the $Al_2O_3$ powder bed immediately before the infiltration step.

Still another method consists of mixing C. P. $Al_2O_3$ powder with 3–20 percent C. P. aluminum silicate and water in sufficient quantity to form a slurry, pouring the slurry into a suitable plaster mold, and allowing it to set into the form required as bed in the infiltration process. Drying and heating are performed in the same manner as described in the first case. The bed can be strengthened by firing at high temperature.

A still further method of producing a mechanically bonded strongly coherent aluminum oxide powder bed consists of hot pressing the granular powder in graphite molds at 1650–1750° C. and 0.5 to 1.5 t. s. i. pressure. Contamination of the C. P. aluminum oxide by the graphite mold material is prevented by coating the walls of the mold cavity with a thin Alundum cement slurry. The resulting hot pressing has the coherence of a ceramic "bisque," which is strong enough to be subjected to mechanical surface cleaning to eliminate all possible surface contaminants. No further firing or other treatment is necessary to permit the use of such bed for the infiltration of titanium carbide skeleton bodies under vacuum of 500–50 microns Hg column.

The following are examples of the production of a jet engine turbine blade according to the invention.

EXAMPLE 1

A titanium carbide powder of a 325 mesh size containing approximately 75% Ti, 18% combined carbon, 2.5% free carbon and the balance free titanium, oxygen, nitrogen, some iron and such minor impurities as zirconium, alkalies, etc., is charged into a graphite crucible and heat-treated in a reducing atmosphere to a temperature of 1900° C. for a period of about 1 hour. The powder becomes agglomerated and, after cooling is crushed, pulverized and passed through a 140 mesh screen. 10% by weight of carbonyl nickel powder of a 325 mesh size is mixed with the titanium carbide powder. The mixture is dry milled in a stainless steel ball-mill for 24 hours.

90 grams of the powder mixture are charged in a graphite mold and hot pressed to a temperature of 1650° C. into a blade-shaped skeleton body having a density of about 63% of full density. By full density is meant the theoretical density of a solid body made from the same mixture used in making the porous skeleton.

After cooling, the skeleton is sintered in a carbon tube furnace at 1600–1700° C. for approximately 2 hours under vacuum, increasing from 500 microns to 50 microns Hg pressure of the carbon monoxide furnace atmosphere.

After cooling under vacuum, the sintered blade skeleton is placed, concave side up, on a bed of C. P. granular aluminum oxide powder contained in a ceramic vessel. The coherence of the bed is increased and conformity of the bed to the blade skeleton shape is established by tapping and settling the aluminum oxide powder mass containing the blade skeleton. Additional aluminum oxide powder is packed around the sides and ends of the blade skeleton until the surface is level with the edges of the blade skeleton, thus providing a perfect seal. Tapping and settling are repeated.

About 80 grams of Inconel sheet of about 1/8" thickness, cut to a size corresponding to the blade skeleton, is bent to conform to the concave curved contour of the blade and is placed on top of the concave side of the skeleton body.

The skeleton embedded in the C. P. aluminum oxide pack is heated in a carbon tube vacuum furnace to 1500° C. for 75 minutes. The Inconel will melt and infiltrate the blade skeleton transversely in a downward direction. The carbon monoxide furnace atmosphere is evacuated during the heating and infiltration. The vacuum improves during this period from 400 to 100 microns Hg pressure. The infiltrated blade is cooled under vacuum until the infiltrant phase has solidified. Cooling is then continued to room temperature in a neutral or reducing atmosphere at atmospheric pressure.

The finished blade has a density of 6.3 g./cc., and a weight of 170 grams.

EXAMPLE 2

The procedure of Example 1 is changed in that the 90 grams of titanium carbide-nickel powder mixture is blended dry with 1% by weight of Resinox plastic consisting of phenol formaldehyde (page 1359, Handbook of Chemistry and Physics, 33rd ed., 1951–52), moistened with acetone and wet mixed thoroughly. The mass is then dried, pulverized and passed through a 100 mesh screen.

The mixture is compacted cold in a carbide lined steel die at a pressure of 10 t. s. i. into a blade shaped skeleton of approximately 65% density of full.

After drying, the skeleton is sintered, embedded in C. P. aluminum oxide powder contained in a ceramic vessel, and infiltrated with Inconel in a carbon tube vacuum furnace as in Example 1.

EXAMPLE 3

The procedure of Example 2 is changed in that 10% by weight of a 325 mesh size electrolytic chromium metal powder is added to the 2.5% free carbon containing titanium carbide powder, the mixture is dry ball-milled for 24 hours, charged into a graphite crucible, and heat-treated in a reducing atmosphere to a temperature of 2000° C. for a period of about 90 minutes. After cooling, the powder agglomerate is crushed, pulverized, passed through a 140 mesh screen mixed with 10% carbonyl nickel powder and ball-milled for 24 hours.

After adding to the mixture 1% Resinox plastic, a blade-shaped skeleton body is cold-pressed to 10 t. s. i. in a carbide lined steel die, the skeleton body is vacuum-sintered, embedded in C. P. aluminum oxide powder pack, and vacuum-infiltrated with Inconel as in Example 1.

EXAMPLE 4

The procedure of Example 3 is changed in that instead of adding 10% electrolytic chromium metal powder to the 2.5% free carbon containing titanium carbide powder, we add 5% by weight of chromium carbide powder of a 140 mesh size and containing 11–12% combined carbon. 5% carbonyl nickel powder is mixed with the heat-treated and pulverized titanium carbide-chromium carbide powder.

After adding the 1% Resinox plastic, the mixture is cold-pressed into a blade shaped skeleton body, vacuum-sintered, embedded in C. P. aluminum oxide powder pack, and vacuum-infiltrated with Inconel as in Example 1.

Obviously, changes may be effected in these examples without departing from the scope of the invention.

Having thus described the invention, what we claim as new and desire to be secured by Letters Patent, is as follows.

What we claim is:

1. In a method for producing a heat resistant article by the infiltration of a porous skeleton body consisting essentially of titanium carbide, the improvement comprising producing said skeleton body from titanium carbide containing about 1% to 3% free carbon and supporting it with a bed consisting essentially of substantially minus 100 mesh chemically pure aluminum oxide leaving exposed at least a portion of said skeleton, contacting the exposed portion of the porous skeleton with a high melting, heat resisting metal with a melting point below the melting point of the titanium carbide skeleton, and subjecting the thus-supported skeleton to infiltration at an elevated temperature above the liquidus temperature of the heat resisting infiltrant metal in a reducing atmosphere of subatmospheric pressure, whereby the free carbon-containing titanium carbide skeleton is substantially completely infiltrated while in contact with said aluminum oxide and whereby the article exhibits improved high temperature strength properties as a result of employing said aluminum oxide as the skeleton support.

2. In a method for producing a heat resistant article by the infiltration of a porous skeleton body consisting essentially of titanium carbide, the improvement comprising producing said skeleton body from titanium carbide containing about 1% to 3% free carbon, up to about 15% chromium and up to about 10% chromium carbide and supporting it with a bed consisting essentially of substantially minus 100 mesh chemically pure aluminum oxide leaving exposed at least a portion of said skeleton, contacting the exposed portion of the porous skeleton with a high melting, heat resisting metal with a melting point below the melting point of the titanium carbide skeleton, and subjecting the thus-supported skeleton to infiltration at an elevated temperature of about 50° to 250° C. above the liquidus temperature of the heat resisting infiltrant metal in a reducing atmosphere of subatmospheric pressure, whereby the free carbon-containing titanium carbide skeleton is substantially completely infiltrated while in contact with said aluminum oxide and whereby the article exhibits improved high temperature strength properties as a result of employing said aluminum oxide as the skeleton support.

3. The method according to claim 2, wherein the titanium carbide skeleton prior to infiltration is sintered in a reducing atmosphere of subatmospheric pressure ranging from about 300 microns down to about 50 microns of mercury column at a temperature at least 100° C. above the infiltration temperature and wherein the infiltration is carried out at a subatmospheric pressure ranging from about 500 microns down to about 50 microns of mercury column.

4. In a method for producing a heat resistant article by the infiltration of a porous skeleton body consisting essentially of titanium carbide, the improvement comprising producing said skeleton body from titanium carbide containing about 1% to 3% free carbon and supporting it with a bed consisting essentially of substantially minus 100 mesh chemically pure aluminum oxide leaving exposed at least a portion of said skeleton, contacting the exposed portion of the skeleton with a heat resisting, chromium-containing, nickel-base alloy and subjecting the thus-supported skeleton to infiltration at an elevated temperature of about 50° to 250° C. above the liquidus temperature of said heat-resisting nickel-base alloy in a reducing atmosphere of subatmospheric pressure, whereby the free carbon-containing titanium carbide skeleton is substantially completely infiltrated while in contact with said aluminum oxide and whereby the article exhibits improved high temperature strength properties as a result of employing said aluminum oxide as the skeleton support.

References Cited in the file of this patent

UNITED STATES PATENTS

| | | |
|---|---|---|
| 1,853,385 | Spade | Apr. 12, 1932 |
| 1,882,972 | Schlecht | Oct. 18, 1932 |
| 1,910,532 | Fetkenheuer | May 23, 1933 |
| 1,910,884 | Comstock | May 23, 1933 |
| 2,034,550 | Adams | Mar. 17, 1936 |
| 2,169,007 | Romp | Aug. 8, 1939 |
| 2,234,371 | Fetz | Mar. 11, 1941 |
| 2,367,404 | Kott | Jan. 16, 1945 |
| 2,422,439 | Schwarzkopf | June 17, 1947 |
| 2,612,443 | Goetzel et al. | Sept. 30, 1952 |

FOREIGN PATENTS

| | | |
|---|---|---|
| 639,138 | Great Britain | June 21, 1950 |